UNITED STATES PATENT OFFICE.

WALTER H. DICKERSON, OF MUSKEGON, MICHIGAN, ASSIGNOR, BY MESNE ASSIGNMENTS, TO EDWARD J. KOEHLER, OF NEW YORK, N. Y.

METHOD OF TREATING WASTE SULFITE LIQUORS AND PRODUCT OBTAINED THEREFROM.

1,397,039.

Specification of Letters Patent.

Patented Nov. 15, 1921.

No Drawing.

Application filed November 16, 1918. Serial No. 262,763.

*To all whom it may concern:*

Be it known that I, WALTER H. DICKERSON, a citizen of the United States, and a resident of Muskegon, in the county of Muskegon and State of Michigan, have invented certain new and useful Improvements in the Methods of Treating Waste Sulfite Liquors and Product Obtained Therefrom, of which the following is a specification.

The invention relates to a process for treating the waste liquors obtained in the production of cellulose or paper pulp by the sulfite process, and it has for its object to obtain therefrom a dry product which possesses valuable properties, as, for example, a binding or adhesive compound or as a tanning agent.

Waste sulfite liquors, when properly treated and concentrated to the desired degree, have been found suitable for use as binders and adhesives and in the tanning industry. The preparation of such agents in liquid form and their industrial application, however, involve certain commercial difficulties, and the said agents in this form possess objectionable features, which it is the object of the present invention to eliminate. A further object of the invention is to provide certain products from the said liquors which will possess a high tanning value, and also to provide products possessing adhesive and other properties.

The novel process consists in so treating and desulfiting the waste sulfite liquors that the active constituents thereof are provided in a dry form, suitable for use as a binder, adhesive, tanning agent, etc., and will be in a more effective, compact and practicable condition not only for use but, also, for transportation and storage. Furthermore, it has been found that the dry material produced by the process set forth possesses a greatly enhanced value as a tanning agent, is decidedly purer, and non-hygroscopic; and, if, as a result of the particular preliminary treatment, the product should contain a high percentage of insolubles, the same will be in such a state as to be a benefit. The product, moreover, is of reduced glucose and sulfur content and substantially free of sulfur dioxid. Furthermore, by re-dissolving the dry material, the characteristic odor, peculiar to similar products from waste sulfite liquors concentrated in various ways, may be eliminated as well as all trace of odor of sulfur dioxid.

In carrying out the process, two facts should be borne in mind. First, highly bisulfited tanning substances or extracts have a decidedly lower tanning value or combining power with hide substance than when such substances or extracts are in their natural state or only slightly bisulfited. A striking example of this is the difference observed in the behavior of ordinary untreated quebracho extracts and highly bisulfited quebracho extracts. The untreated extracts will show considerable insolubles on dissolving in water, while the highly treated extracts will entirely dissolve in water to a clear solution. But, on the other hand, the natural untreated extract has a much higher combining value with hide substance than the highly treated product. It is apparent from this that if the waste sulfite liquors can be desulfited or deprived to a large extent of the sulfur dioxid content, they should have a very decidedly increased combining value with hide substance. Secondly, it is also to be borne in mind that waste sulfite liquors contain chemical groups or bodies of an aldehyde-like nature and a phenol-like nature, as well as a form of sulfonic acid. It is a well-known fact that if phenol and aldehyde, or their like bodies or derivatives, are brought together, or either one or both are brought together with sulfonic acid under proper temperature and pressure conditions, they may be partially condensed into synthetic substances or compounds having high tanning value; and it appears that in the process herein set forth these conditions are realized. The resulting product is a dry, apparently partly-condensed, highly desulfited product obtained from the waste sulfite liquors, which product, however, possesses, among other desirable properties, a greater or less degree of solubility, dependent upon the preliminary treatment to which it has been subjected.

Heretofore, it has been the practice to merely concentrate the waste sulfite liquors in multiple effect vacuum evaporators to the desired degree, eliminating therefrom in any well-known or special manner only calcium compounds and reducing the sulfur dioxid content of the liquor. In accordance with the present process, the waste sulfite liquors are preferably thus first freed from the bases present, such as calcium and magnesium compounds, and concentrated, and the solution is then thoroughly dried to provide a powder; or, the concentration and drying action may be effected simultaneously. In some cases, however, it may be found preferable to first concentrate the liquors to a desired degree, then process them for the freeing of the organic complexes from calcium and magnesium bases, and finally dry to a powder.

A specific example of the preliminary treatment referred to, which in connection with the subsequent drying process herein set forth effects a particularly beneficial result, is as follows; and the waste liquors (which it is understood will vary at each mill, due to the different character of wood and the lime rock employed, as well as the method of cooking) thus treated have been found to undergo a very striking and valuable change in their chemical constitution. Dilute liquor or partly concentrated liquor in the raw state or preliminarily treated condition is acted upon with chlorin gas by passing the latter directly into the liquor either under pressure or at atmospheric pressure, whereupon, it will be absorbed by said liquor, gradually changing the same to a bright orange-red color. Depending upon the degree to which the reaction is carried, a yellowish precipitate will develop, the same being in a very fine state of suspension, but settling after allowing the liquor to stand for a certain period, and leaving a bright orange-red colored liquor. This precipitate may be re-dissolved to form a darker and deeper colored solution by heating the liquor after a large amount of precipitate has been formed.

If desired, the precipitate may be filtered out and used for any desired purpose, or may be further treated in the production of tanning extracts, dye compounds, filling material, condensation products, etc., and the filtrate treated for similar purposes. It is preferred, however, to re-dissolve the precipitate by heating in separate solution or in its own liquor and then treating in manner hereinafter set forth to obtain a dry powder. In the chlorinization of the waste sulfite liquors hereinbefore described, a very superior tanning extract is obtained, which has a much higher degree of purity than any extract heretofore produced from waste sulfite liquors, showing as high as seventy (70%) per cent. purity in the ratio of material absorbed by hide to the total solids. The extract, moreover, will not respond to the usual tests which are applied for the detection of sulfite cellulose extracts, and the leather prepared therewith has a very mellow and fine feeling, and is of a fine oak color. It is to be understood that the liquors thus prepared are to be freed, either in dilute or concentrated state, from calcium or magnesium and, as such, are suitable for use or may be treated to provide a dry powder product, as hereinafter set forth.

In treating waste sulfite liquors to produce tanning compounds, by the processes heretofore disclosed, various methods have been proposed for the removal of calcium as part of these processes and the freeing of the tanning complex or element which has the property of combining with the hide substance. A great many waste sulfite liquors, however, contain a large percentage of magnesia base along with the calcium base present in them. The different relative percentages of calcium and magnesium present depend upon the character of the original lime rock used in the manufacture of bisulfite solution which has been used for the cooking process. I have ascertained that where the liquors are processed only for the removal of the calcium present, they do not show as high a tanning content as where such liquors are processed also to liberate their organic complexes from the magnesium base present. The method of procedure which I propose is to determine by analysis the amount each of calcium and magnesium base present. There is then added sufficient reagent, or reagents, as to combine not only with the calcium to form insoluble compounds and precipitate it from the liquor, but also to combine with the magnesium. Or, I may use one reagent to precipitate the calcium, and another the magnesium. I have ascertained that it is not necessary in the production of a satisfactory product to precipitate the magnesium out of the liquor, but that it may exist in solution, provided it is combined with another substance to form a distinct compound free from the organic complexes present.

The above results may be accomplished in various ways. The liquors may be treated with a salt or electrolyte, the acid radical of which will combine with both the magnesium and calcium present. Such salt may be chromium sulfate, aluminum sulfate, sodium sulfate or bisulfate, or ammonium sulfate, or any other salt suitable for the purpose. The base of the salt in the above cases will remain in combination in the liquor with the organic complex; and the presence of such substances as aluminum and chromium in the waste sulfite liquors have been found to be beneficial. On the other hand, where the bases of the salts used are strongly alkaline, as sodium, it may be found necessary to acidify the resultant product. I prefer, however, to avoid the use of electrolytes which have a strong alkaline base, which will remain in the liquor after the magnesium and calcium bases have been freed from the complex. Another method of procedure may be to use electrolytes such as the above in quantity sufficient to furnish the necessary amount of acid radical to combine with the calcium to form an insoluble compound and to precipitate it from the liquor. An acid which will form a distinct compound with the magnesium base present may then be added in quantity sufficient to combine with the amount of magnesium in the liquor—such as acid, for instance, as sulfuric acid. In adding the sulfuric acid, however, great care should be taken to add it in dilute state so as not to bring about intensive local heating, and consequently decomposition in the liquor. If it be desired to entirely remove the magnesium base, this may be readily accomplished by adding a sufficient quantity of oxalic acid, after the removal of the calcium. Or, in some instances, it may be desirable to remove both bases by oxalic acid. Any iron present may also be removed by oxalic acid, with the bases or separately, after the calcium and magnesium have been removed.

In the preparation of concentrated neutral waste sulfite liquor products, it has heretofore been proposed to use calcium compounds. I have ascertained that the use of magnesium compounds, such as magnesite, for example, is a preferable procedure to that of using lime or calcium compounds. Where the product is to be used for certain binder purposes, for instance, the resultant product is of a much better character when magnesite is used; and where such concentrated neutral liquors are subjected to further treatment for the production of said products, the use of magnesite results in a product of much better color than that which can be obtained by the use of lime.

In order to bring about the reactions disclosed above and obtain the desired characteristics in the final product, notably the partial condensation, and as nearly as possible the complete removal of sulfur dioxid, it is necessary to reduce the sulfite liquor to a dry solid condition with extreme rapidity and in a finely-divided condition. I have ascertained that it is impossible to reduce waste sulfite liquor products or waste sulfite liquor, especially in an acid condition, to the state of a dry solid, in mass, without bringing about undesirable decomposition reactions to the injury of the product. I have further ascertained that the desired results may be obtained by bringing the waste sulfite liquors or waste liquor products in a liquid condition and finely-divided state in contact with hot gases and in such a manner that the drying is accomplished with extreme rapidity, especially in a non-saturated atmosphere. If these conditions are fulfilled, the resultant dry powder product will show the characteristics of the partial condensation reaction and have a minimum content of sulfur dioxid.

The production of a dry powder product of waste sulfite liquor may be accomplished in a number of ways. It may be produced directly from the thin liquor in a single operation; or, the liquor may be first concentrated and then reduced in a single operation to a dry powder. The thin liquor, either treated or untreated, may be atomized by means of air or sprayed under pressure into a single chamber or tower and reduced directly to a powder. The atomized or sprayed liquor may be introduced into the top of such chamber or tower and the hot gases or air may be introduced at the bottom, the gases ascending and the finely-divided dry product descending, the gases passing out at the top or side above the zone of the spray or in the zone of the spray, and the dry powder product being removed from the bottom of the chamber or tower. Ordinary flue gases may be employed for the concentrating and drying operations and the entrained carbonaceous and other matter may be first removed therefrom by electrostatic precipitation, or the same may be filtered out of the liquor.

Waste sulfite liquors, also, either treated or untreated, may for the purpose hereinbefore set forth be first concentrated to any desired degree, as for instance in a multiple effect vacuum evaporator, and then handled in the same manner to produce a dry powder. If air atomizing is used for carrying out the above method of reducing to a dry powder, it will be found that the material is reduced to an extremely fine condition, in fact, a good part of the product will be so fine that it will be carried out with the effluent gas, resulting in the loss of a large percentage of the product by entrainment. In order to prevent this loss, it is necessary to pass the effluent gases through collecting chambers and then subject them to processes for the recovery of the fine particles entrained, as, for example, by the electrostatic precipitation method or by some system of dust collection or otherwise. As the effluent gas from the chamber or tower is in approximately a moisture saturated condition (which it is necessary to have in order to effect any degree of economy) it may be possible by a slight reduction of pressure to cause a fog which will collect the fine particles of dust and thus prevent the loss of product. This moist finely-divided material will have to be re-dissolved and put through the chamber again. Or another method for the single stage operation may consist in introducing both the hot gases and the sprayed material at the top or sides of the chamber or tower together, the effluent gas passing down through the chamber or tower with the powder after it is dried. In this case likewise it will be necessary to provide some means to catch the extremely fine particles of dried solids which will be entrained with the effluent gas or air.

The method which I prefer to use, however, is one in which the operation is carried out in two stages. In the first stage, the thin liquor is sprayed under low pressure into a chamber through which hot gases are passed, the amount of heat carried in the gases and the amount of water to be evaporated being so proportioned that the effluent gas is discharged in a saturated condition from the chamber at as low a temperature as possible in order to effect the highest degree of economy. The liquor, which may be concentrated in this manner to a density of from thirty (30%) per cent. to sixty (60%) per cent. of solids in this first stage chamber, is then sprayed under high pressure into a second stage chamber, through which hot gases are passed and reduced thereby to a dry powder product. The amount of heat in the gases introduced in the second stage chamber should be so proportioned to the amount of water to be evaporated from the sprayed material that the effluent gases will come out from the chamber at a temperature approximately at the boiling point, say at two hundred (200) degrees or higher; and in a non-saturated condition. The effluent gases from the second stage chamber then pass into the first chamber where the remaining amount of heat which they contain is used up in further evaporation of the thin liquor. Or, the liquor may be first sprayed into a low pressure wet chamber, passed through a multiple effect vacuum evaporator to be further concentrated, and then finally sprayed into the high pressure dry chamber to provide the dry powder.

The dry powder product produced in the second stage chamber should be removed quickly so as not to subject it to the undue heating by the hot gases passing through the chamber. The degree of fineness of the finished product, when the reduction to a dry powder condition is carried out by the two-stage process, is absolutely under control when the spraying is effected by pressure alone. I, therefore, do not limit myself to any specific pressure to be employed. A thin liquor containing a low per cent. of solids will produce a much finer product at the same pressure by spraying than will a liquor of a denser and higher content of solids. Also, with the same density or percentage of solids of the liquor, a high pressure spraying will give a much finer product than when sprayed at a low pressure. I have found, however, that a pressure of from five hundred (500) to one thousand (1000) pounds per square inch and a gas temperature of from three hundred (300°) degrees F. to five hundred (500°) degrees F. provides a satisfactory product.

It will be found where either the concentrated or specially treated product is sprayed into the single stage tower or chamber, especially by air atomizing, that the particles will be very small and of a sphere or spheroid shape, but solid. On the other hand, where the product is produced by pressure spraying, especially in the two stage process when the concentrated liquor is sprayed under high pressure, part of the dry solid particles will be found to be solid and of a sphere or spheroid shape, and part of them will be found to be hollow spheres with a blow-out or opening in them. Also, where the liquid product is reduced to a dry powder, under the conditions as in the second stage of the two-stage process, being dried almost instantly in a non-saturated atmosphere of a hot gas, the particles produced will be found to be glazed on the surface and the product will be in a highly non-hydroscopic condition. In other words, the dry powder product thus obtained from waste sulfite liquor, or products derived therefrom, will be found to be of a non-hygroscopic nature. On the other hand, dried powder from sulfite liquor or sulfite liquor products produced by other methods, where the drying takes place in a vapor saturated atmosphere, are found to be highly hygroscopic. Finally, where waste sulfite liquors or waste sulfite liquor products are reduced to a dry powder condition by being introduced in a finely-divided state (as by pressure spraying) into a moving body of hot gas in sufficient quantity to be dried in a non-saturated atmosphere, there results a super-drying of the finely-divided product without bringing about any deleterious decomposition. A high degree of desulfiting of the finished product results, also, as well as a partial condensation of the solid constituents thereof whereby there is afforded a non-hygroscopic, dry powder.

In connection with the process hereinbefore set forth, it is to be noted that the same affords, moreover, a convenient method of disposing of waste sulfite liquors where the accumulation and disposal of same becomes a serious problem. It will be appreciated that these liquors may be conveniently converted into the form of a dry powder, as hereinbefore disclosed, and this powder itself employed to furnish at least a portion of the heat necessary for effecting the partial condensation of the said waste sulfite liquors. This may be effected, for example, by mixing the dried powder or briqueting same with a suitable combustible material, as coal-dust, saw-dust or other refuse material, and then burning the mixture in suitable furnaces to provide the desired heat.

I claim:

1. As a new article of manufacture, a dry soluble product obtained from waste sulfite liquors substantially free from sulfur dioxid and reacting when in solution with hide substance to form leather.

2. As a new article of manufacture, a dry soluble, condensation product obtained from waste sulfite liquors.

3. As a new article of manufacture, a dry soluble, condensation product obtained from waste sulfite liquors and substantially free from calcium and sulfur dioxid.

4. As a new article of manufacture, a dry, soluble, substantially calcium free and non-hygroscopic product comprising the solid organic constituents of waste sulfite liquors.

5. As a new article of manufacture, a dry, atomized soluble product obtained from waste sulfite liquors and substantially free from calcium and sulfur dioxid.

6. As a new article of manufacture, a dry, atomized soluble product obtained from waste sulfite liquors and substantially free from calcium and sulfur dioxid and of reduced glucose content.

7. As a new article of manufacture, a dry, atomized soluble product obtained from waste sulfite liquors and substantially free from calcium and magnesium and sulfur dioxid and of reduced glucose content.

8. As a new article of manufacture, a dry, atomized soluble product obtained from waste sulfite liquors and substantially free from calcium and sulfur dioxid, of reduced glucose content, and containing a salt.

9. As a new article of manufacture, a dry, soluble product obtained from waste sulfite liquors and substantially free from calcium and sulfur dioxid, of reduced glucose content and containing an aluminum salt.

10. As a new article of manufacture, a dry, soluble and non-hygroscopic product obtained from waste sulfite liquors and substantially free from calcium and sulfur dioxid, of reduced glucose content and containing an aluminum salt.

11. As a new article of manufacture, the solid organic constituents of waste sulfite liquors in the form of a dry powder.

12. As a new article of manufacture, a tanning powder obtained from waste sulfite liquors and of a purity exceeding fifty-one (51%) per cent.

13. A tanning extract comprising the atomized constituents of waste sulfite liquor in dry, powdered form and substantially free of calcium.

14. As a new article of manufacture, a non-hygroscopic tanning powder obtained from waste sulfite liquors and of a purity exceeding fifty-one (51%) per cent.

15. As a new article of manufacture, a dry non-hygroscopic powder consisting solely of the solid organic constituents of waste sulfite liquors.

16. As a new article of manufacture, the partly-condensed solid constituents of waste sulfite liquors in the form of a dry powder soluble in water.

17. As a new article of manufacture, the partly-condensed solid constituents of waste sulfite liquors in the form of a dry powder having a glazed surface and soluble in water.

18. As a new article of manufacture, the partly-condensed solid constituents of waste sulfite liquors in the form of a non-hygroscopic, dry powder soluble in water.

19. As a new article of manufacture, a partly-condensed product consisting of the solid organic constituents of waste sulfite liquors.

20. As a new article of manufacture, a partly-condensed product consisting of the solid organic constituents of waste sulfite liquors and in the form of a dry powder.

21. As a new article of manufacture, the solid constituents of waste sulfite liquors in the form of a hollow sphere.

22. As a new article of manufacture, the solid constituents of waste sulfite liquors in the form of a sphere glazed on the surface.

23. As a new article of manufacture, the solid constituents of waste sulfite liquors in the form of a hollow sphere provided with an opening.

24. As a new article of manufacture, the solid constituents of waste sulfite liquors in the form of a hollow sphere provided with an opening and glazed on the outside.

25. As a new article of manufacture, the solid constituents of waste sulfite liquors in the form of a hollow sphere provided with an opening and glazed both on the outside and inside.

26. The hereindescribed method of treating waste sulfite liquors to recover the solid constituents thereof, which consists in substantially freeing the liquors from calcium, concentrating the liquors, and subjecting the liquors in finely-divided state to heat.

27. The hereindescribed method of treating waste sulfite liquors to recover the solid constituents thereof, which consists in substantially freeing the liquors from calcium and magnesium, concentrating the liquors, and subjecting the liquor in finely-divided state to heat.

28. The hereindescribed method of treating waste sulfite liquors to recover the solid constituents thereof, which consists in concentrating the liquors, liberating the tanning complex and subjecting the liquor in finely-divided state to heat.

29. The hereindescribed method of treating waste sulfite liquors to recover the solid constituents thereof, which consists in concentrating same by spraying into a hot gas, and subjecting the concentrated liquor in finely-divided state to heat.

30. The hereindescribed method of treating waste sufite liquors to recover the solid constituents thereof, which consists in concentrating same by spraying into a hot gas and then evaporating, and subjecting the concentrated liquor in finely-divided state to heat.

31. The hereindescribed method of treating waste sulfite liquors to recover the solid constituents thereof, which consists in concentrating same by spraying into a hot gas, liberating the tanning complex, and subjecting the concentrated liquor in finely-divided state to heat.

32. The hereindescribed method of treating waste sulfite liquors to recover the solid constituents thereof, which consists in concentrating same by spraying into a hot gas and then evaporating, liberating the tanning complex, and subjecting the concentrated liquor in finely-divided state to heat.

33. The hereindescribed method of treating waste sulfite liquors to recover the solid constituents thereof, which consists in spraying to free from sulfur dioxid, concentrating same by spraying into a hot gas, liberating the tanning complex, and subjecting the concentrated liquor in finely-divided state to heat.

34. The hereindescribed method of treating waste sulfite liquors which consists in freeing same from calcium and recovering the organic constituents in dry solid form by concentrating same by spraying into a hot gas, and subjecting the concentrated liquor in finely-divided state to heat.

35. The hereindescribed method of treating waste sulfite liquors to recover the solid constituents thereof in the form of a dry powder, which consists in effecting a partial condensation of the same.

36. The hereindescribed method of treating waste sulfite liquors to recover the solid constituents thereof in the form of a dry powder, which consists in effecting a partial condensation of the same by spraying the liquors in the presence of hot gas.

37. The hereindescribed method of treating waste sulfite liquors to recover the solid constituents thereof in the form of a dry powder, which consists in effecting a partial condensation of the same by spraying the liquors under pressure into a hot gas.

38. The hereindescribed method of treating waste sulfite liquors to recover the solid constituents thereof in the form of a dry powder, which consists in concentrating the same to a density of from thirty (30%) per cent. to sixty (60%) per cent. of solids and spraying the same into a hot gas.

39. The hereindescribed method of treating waste sulfite liquors to recover the solid constituents thereof in the form of a dry powder, which consists in concentrating the same and atomizing the concentrate at a pressure of from five hundred (500) to one thousand (1000) pounds per square inch in the presence of gas at a temperature of not less than two hundred (200°) degrees F.

40. The hereindescribed method of treating waste sulfite liquors to recover the solid constituents thereof in the form of a dry powder, which consists in concentrating the same and atomizing the concentrate at a pressure of from five hundred (500) to one thousand (1000) pounds per square inch in the presence of gas at a temperature between three hundred (300°) degrees F. and five hundred (500°) degrees F.

41. The hereindescribed method of treating waste sulfite liquors, which consists in passing chlorine gas therethrough, re-dissolving the precipitate and subjecting the same in finely-divided state to heat.

42. The hereindescribed method of treating waste sulfite liquors, which consists in passing chlorin gas therethrugh, removing the precipitate formed, re-dissolving said precipitate and subjecting the same in finely-divided state to heat.

43. The hereindescribed method of treating waste sulfite liquors, which consists in passing chlorin gas therethrough, removing the precipitate formed, re-dissolving the precipitate and atomizing same in the presence of a hot gas.

44. The hereindescribed method of treating waste sulfite liquors, which consists in passing chlorin gas therethrough, removing the precipitate formed, re-dissolving the precipitate and subjecting the same in finely-divided state to heat, and also subjecting the filtrate in finely-divided state to heat.

Signed at Muskegon in the county of Muskegon and State of Michigan this twelfth day of November, A. D., 1918.

WALTER H. DICKERSON.

Witnesses:
R. F. RODGERS,
GEO. H. TOUSEY,